US007945639B2

(12) United States Patent
Gavrilov et al.

(10) Patent No.: US 7,945,639 B2
(45) Date of Patent: May 17, 2011

(54) PROCESSING WRITE REQUESTS WITH SERVER HAVING GLOBAL KNOWLEDGE

(75) Inventors: Dmitri Gavrilov, Redmond, WA (US); Eric S. Fleischman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 11/769,474

(22) Filed: Jun. 27, 2007

(65) Prior Publication Data

US 2009/0006487 A1 Jan. 1, 2009

(51) Int. Cl.
*G06F 15/16* (2006.01)
(52) U.S. Cl. .................................................. 709/217
(58) Field of Classification Search ............. 709/217, 709/223
See application file for complete search history.

(56) References Cited

U.S. PATENT DOCUMENTS

| 6,356,941 | B1 | 3/2002 | Cohen |
| 7,024,429 | B2 | 4/2006 | Ngo et al. |
| 7,200,664 | B2 | 4/2007 | Hayden |
| 2004/0078569 | A1 | 4/2004 | Hotti |
| 2004/0230615 | A1 | 11/2004 | Blanco et al. |
| 2005/0010618 | A1* | 1/2005 | Hayden .......................... 707/204 |
| 2007/0245409 | A1* | 10/2007 | Harris et al. ....................... 726/5 |

OTHER PUBLICATIONS

International Search Report and Written Opinion for PCT Application No. PCT/US2008/067143 dated Dec. 29, 2008.

\* cited by examiner

*Primary Examiner* — Wing F Chan
*Assistant Examiner* — Andrew Woo
(74) *Attorney, Agent, or Firm* — Merchant & Gould P.C.

(57) ABSTRACT

Described are embodiments directed to processing write requests using designated servers with global knowledge of information within a distributed system. The designated servers are used to enforce a data rule that limits the data that may be written to the distributed system. In order to ensure that data written to the distributed system is consistent with the data rule, when another server within the distributed system receives a request to write information that is subject to the data rule, it must consult with one of the designated servers before it can accept the write request. If the designated server determines that the data is consistent with the data rule, the write request is approved. Otherwise, the write request is denied.

17 Claims, 6 Drawing Sheets

US 7,945,639 B2

PROCESSING WRITE REQUESTS WITH SERVER HAVING GLOBAL KNOWLEDGE

BACKGROUND

Distributed systems, such as file systems and directory systems, store replicas, or copies, of the same information on a number of different nodes (i.e., servers). Having a number of nodes with replicas provides benefits such as fault tolerance, high availability of information, and improved system performance. A subset of these distributed systems allows each node that stores a replica of information to accept original changes to the information. That is, a node has authority to provide both read and write access to the information. These systems also employ a replication protocol where nodes obtain from one another the changes that have been made to the information. This allows the nodes to each operate in isolation, and then "sync up" with their peers later such that other nodes can be made current. These types of systems are referred to as multi-master replication systems.

Lightweight Directory Access Protocol (LDAP) systems are examples of systems that are sometimes implemented as multi-master replication systems. LDAP systems are used to store many sorts of data including data supplied by users, such as addresses and passwords, and also data provided by managed IT systems, such as permissions. Organizations very often want to enforce rules, or business logic, on the data stored in LDAP directories. For example, one such directory may store user identification numbers. An IT organization may want the system to enforce a rule that requires user identification numbers to be unique, i.e., no two users may have the user identification number. Unfortunately, in LDAP systems implemented as multi-master replication systems, this is difficult to accomplish. Each node can accept write requests for a user's identification number with different values. While each node could check data against the rule, they are limited to its own view of the data. It is possible that other nodes are concurrently accepting writes not yet known to a particular node which, when replication is complete, will leave the system in such a state that is inconsistent with respect to the rule (i.e., the same identification number is assigned to different users).

It is with respect to these and other considerations that embodiments of the present invention have been made. Also, although relatively specific problems have been discussed, it should be understood that embodiments of the present invention should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Described are embodiments directed to using designated servers with global knowledge of information within a distributed system to approve write requests made to nodes in the distributed system. The servers enforce a data rule that places limits on the data that may be written to the distributed system, an example of a data rule being uniqueness of data. The distributed system is designed to provide the designated servers with the global knowledge for enforcing the data rule. When another server within the distributed system receives a request to write data that is subject to the data rule, the server must consult with one of the designated servers before it can accept the write request. This ensures that any data written to the distributed system is consistent with the data rule. If the designated server determines that the data is consistent with the rule, the write request is approved and the designated server decides whether to update its local state in response to the request. Otherwise, the write request is denied.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
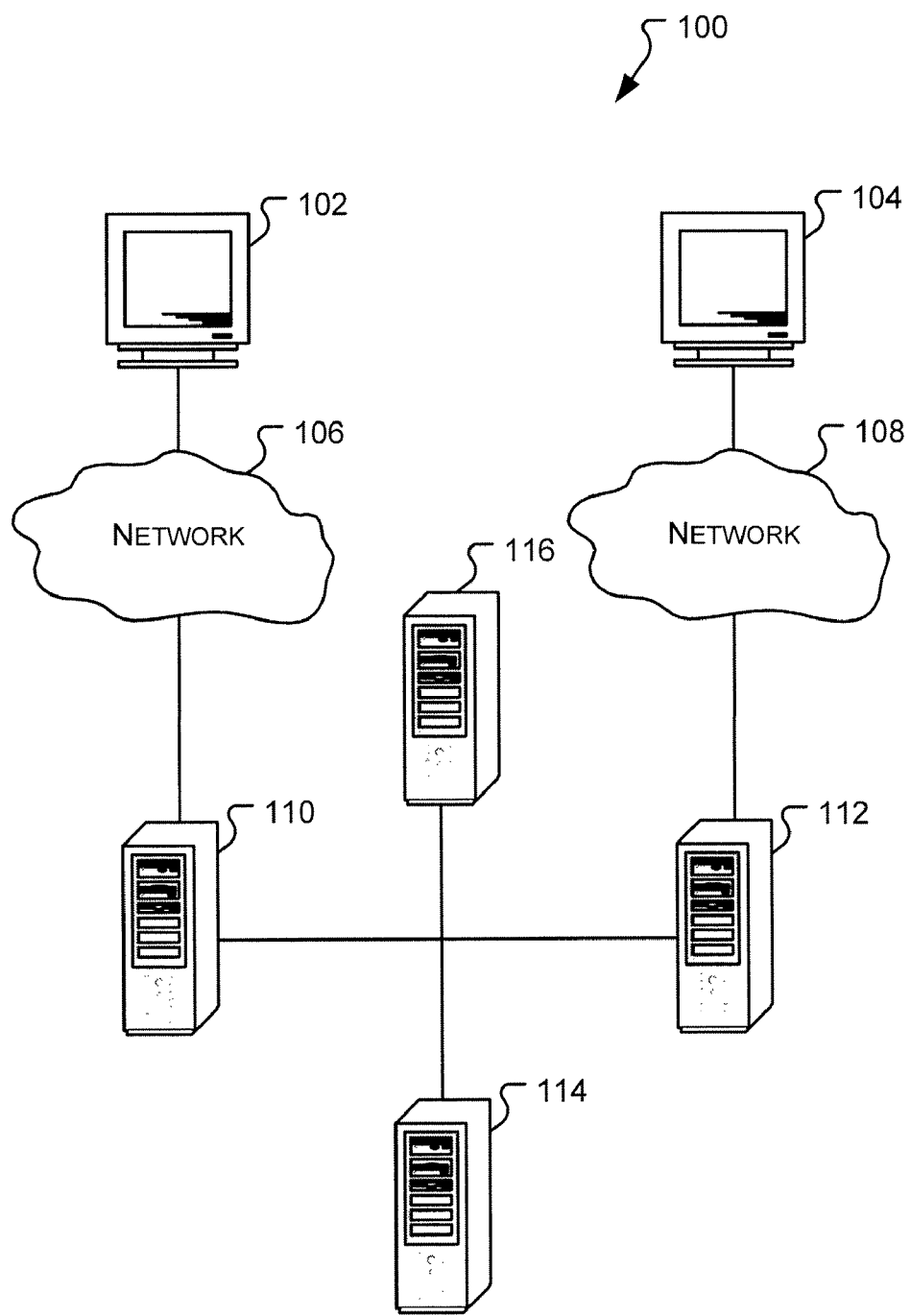
FIG. 1 illustrates a prior art distributed system.

FIG. 1 illustrates a distributed system 100, with client computer systems 102 and 104 that may access, through networks 106 and 108, a number of nodes illustrated in FIG. 1 as server computer systems 110, 112, 114, and 116. Servers 110, 112, 114, and 116 may store information such as a distributed file system or a distributed directory. Each of servers 110, 112, 114, and 116 store a replica, or copy, of the same information. System 100 is an example of a multi-master replication system in which servers 110, 112, 114, and 116 have authority to provide both read and write access to clients, such as clients 102 and 104. System 100 also has a replication protocol that allows servers 110, 112, 114, and 116 to obtain information from one another regarding changes that have been made to the information. Servers 110, 112, 114, and 116 operate in isolation, and then replicate with each other to periodically synchronize changes made to the information. System 100 provides a number of advantages, such as making information readily accessible to a number of users, and also fault tolerance, because failure of one of servers 110, 112, 114, and 116 does not result in the loss of the information or loss of access to the information.

Clients 102 and 104 are nodes within system 100 that issue requests to servers 110 and 112 to read or modify data. In embodiments, clients 102 and 104 may not host any data from system 100, while in other embodiments clients 102 and 104 may host at least some data. It should be understood that the term "client" in this patent application is intended to mean any process that issues a request to another process. For purposes of simplicity FIG. 1 shows clients 102 and 104 as only accessing servers 110 and 112 respectively. As those with skill in the art will appreciate, some distributed systems allow clients 102 and 104 access to any of servers 110, 112, 114, and 116. FIG. 1 also shows clients 102 and 104 as using different networks 106 and 108 to access servers 110 and 112, however as those with skill in the art will appreciate some distributed systems allow a number of clients to access servers through the same network (or networks).

Although system 100 does provide a number of advantages, it also suffers from some limitations. Conflicts in the data stored in system 100 may arise when one or more of servers 110, 112, 114, and 116 are temporarily disconnected from system 100. For example, servers 110 and 112 may become temporarily disconnected from system 100. During this time, server 110 may accept a write request assigning a user ID to a first user, while server 112 may assign the same user ID to a second user.

System 100 fails to provide a mechanism to effectively enforce global data rules. In this patent application, the term "global data rule" is intended to mean a rule that provides a business process associated with data that may be stored in a distributed system. For example, the business process may be a constraint on the data, e.g., a user ID must be associated with only one user, or may be a process performed with the data, e.g., forwarding all name changes to a human resource database. To effectively enforce global data rules, one or more servers must have global knowledge (updated knowledge of information on all of the replicas, or copies). One example of a global data rule is data uniqueness. That is, requiring data to have a unique value on all replicas or copies of information in the distributed system. One specific example is requiring a user identification number to have a unique value throughout a distributed system.

As illustrated in FIG. 1 and described below, system 100 cannot enforce a global data rule. Expanding on the example of user identification numbers, each of servers 110, 112, 114, and 116 can accept and apply write requests for a person's user identification number. Client 102 can submit a write request to server 110 assigning a first user an identification number. Client 104 may have recently submitted a write request to server 112 assigning the same user identification number to a different user. While each of servers 110 and 112 could check data to determine whether the user identification number is unique, they are limited to their own view of the data. Accordingly, system 100 will have information that is inconsistent with the rule that requires user identification numbers to be uniquely associated with a single user.

Figure 2:
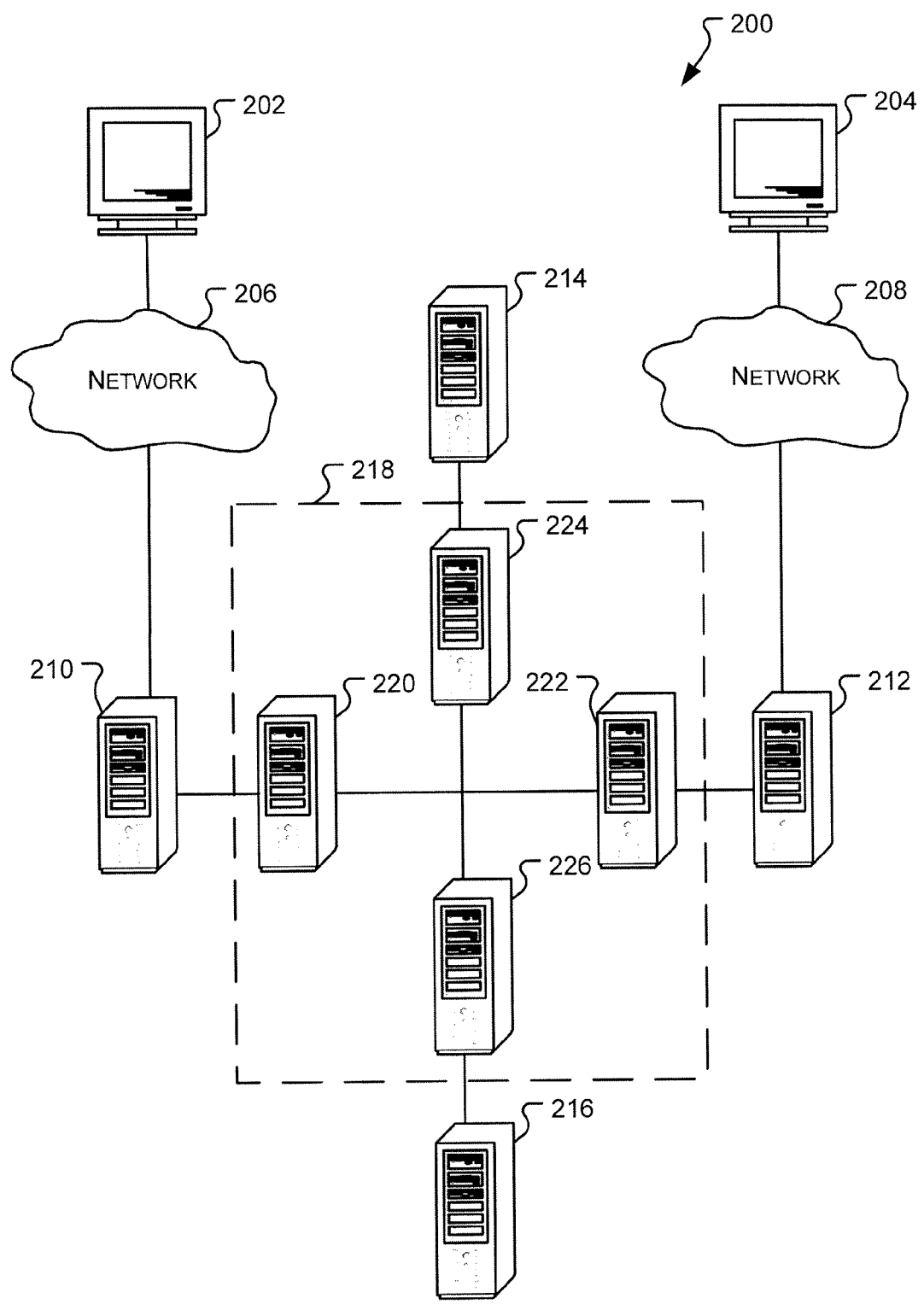
FIG. 2 illustrates a distributed system that is consistent with an embodiment.

FIG. 2 illustrates a distributed system 200 according to an embodiment. In addition to providing the usual advantages of a distributed system, system 200 also allows a global data rule that restricts data within system 200 to be efficiently and effectively enforced. System 200 includes client computer systems 202 and 204 that use networks 206 and 208 to access a number of nodes, illustrated in FIG. 2 as receiving server computer systems 210, 212, 214, and 216. System 200 further includes central computer systems 220, 222, 224, and 226 that have global knowledge of information in system 200 (or can very quickly build global knowledge), and are used by system 200 to enforce global data rules. As those skilled in the art will appreciate there may be many different numbers of such receiving and central server computer systems.

Referring again to receiving servers 210, 212, 214, and 216, they store information such as a distributed file system or a distributed directory. Each of receiving servers 210, 212, 214, and 216 store a replica, or copy, of the same information. System 200 is a multi-master replication system with the receiving servers 210, 212, 214, and 216 having authority to provide both read and write access to clients, such as clients 202 and 204. System 200 also has a replication protocol that allows receiving servers 210, 212, 214, and 216 to obtain information from one another regarding changes that have been made to the information. Servers 210, 212, 214, and 216 operate in isolation, and then replicate with each other to periodically synchronize the changes that have been made in their respective replicas. System 200 makes information readily accessible to a number of users, and is also fault tolerant, because failure of one of servers 210, 212, 214, and 216 does not result in the loss of the information or loss of access to the information.

In an embodiment, receiving servers 210, 212, 214, and 216 do not have the global knowledge to enforce global data rules. However, in some embodiments, receiving servers 210, 212, 214, and 216 can store and enforce "local data rules." In this patent application, the term "local data rule" is intended to mean a rule that provides a constraint on the data that may be stored in a distributed system, but does not require global knowledge (knowledge of information on all of the replicas, or copies) to effectively be enforced. Examples of local data rules include requiring user identification numbers to have 8 digits, or not allowing telephone numbers to have letters. As can be appreciated, local data rules are useful in limiting the data that can be stored in a distributed system, but do not require global knowledge in order to effectively be enforced.

System 200 also includes a set of central servers 220, 222, 224, and 226 illustrated within dashed line 218. Central servers 220, 222, 224, and 226 have global knowledge of information in system 200 (or can quickly build the necessary knowledge) to effectively and efficiently enforce a global data rule. Each of central servers 220, 222, 224, and 226 store a replica, or copy, of the same information as receiving servers 210, 212, 214, and 216. Central servers 220, 222, 224, and 226 are initially normal servers similar to receiving servers 210, 212, 214, and 216. The central servers are selected to have up-to-date knowledge of information within system 200 to allow them to enforce global data rules. In some embodiments, they may be selected by a network administrator, for example, by simply setting a flag. The decision of which servers should be promoted to central servers may be based on particular properties of a server. For example, those serves that have the best network link may be selected as central servers. The decision regarding which servers are selected as central servers may be based on other selection criteria, e.g., characteristics or properties of the individual servers or system 200.

The replicas in central servers 220, 222, 224, and 226 have up-to-date information compared to the replicas in receiving servers 210, 212, 214, and 216. The updated information in central servers 220, 222, 224, and 226 may be based at least in part on their replication protocol and topology, discussed in detail with respect to FIG. 3 below. As shown in FIG. 2, each of the receiving servers 210, 212, 214, and 216 are connected to one of the central servers 220, 222, 224, and 226, and must consult with one of the central servers 220, 222, 224, and 226 before being able to accept a write request that relates to data subject to a global data rule. Central servers 220, 222, 224, and 226 enforce global data rules to ensure that information written to replicas within system 200 is consistent with established global data rules.

Central servers 220, 222, 224, and 226 engage in replication with each other to obtain information from one another regarding changes that have been made to information in system 200. Central servers 220, 222, 224, and 226 have global knowledge (or are able to quickly build global knowledge) with respect to data that is subject to global data rules. Central servers 220, 222, 224, and 226 in embodiments obtain their global knowledge partly through a replication protocol that quickly provides central servers 220, 222, 224, and 226 with any changes made within system 200. As explained further below with respect to FIG. 3, in embodiments central servers 220, 222, 224, and 226 have a replication protocol that is different than the replication protocol used by receiving servers 210, 212, 214, and 216, which are not required to have global knowledge. In other embodiments, central servers 220, 222, 224, and 226 may use the same replication protocol as servers 210, 212, 214, and 216, but more aggressively replicate changes, such as have a shorter time window between replication of changes.

System 200 allows an administrator to establish a global data rule that in some embodiments is stored at least on central servers 220, 222, 224, and 226. In embodiments, the receiving servers 210, 212, 214, and 216 store enough information about the global data rule to determine when it is applicable. The receiving servers 210, 212, 214, and 216 are then required to consult one of the central servers 220, 222, 224, and 226 before they can allow a write request subject to the global data rule. Because the receiving servers are only required to consult a single central server, a global data rule can be efficiently enforced within system 200.

System 200 operates by giving receiving servers 210, 212, 214, and 216 the authority to provide both read and write access to clients, such as clients 202 and 204. Receiving servers 210, 212, 214, and 216 can accept write requests to write data to their respective replicas. However, if a write request relates to data subject to an established global data rule, then receiving servers 210, 212, 214, and 216 must consult with one of central servers 220, 222, 224, and 226 before they can execute the write request. Because each of central servers 220, 222, 224, and 226 have the global knowledge (or can very quickly build the global knowledge) to enforce the global data rule, consulting with any one of those central servers allows a receiving server to be confident that data is consistent with the global data rule and can thus execute the request.

An example will be described to further illustrate the operation of system 200. An administrator may establish a global data rule to limit the value of data within system 200. As an example, the data rule may require that each user identification number in system 200 be unique, i.e., no two people can have the same user identification number. The data rule requiring the uniqueness of each user identification number is then stored in central servers 220, 222, 224, and 226. An indication of the existence of the data rule is stored on all of the receiving servers 210, 212, 214, and 216 so that they are aware that any write requests that relate to user identification numbers must be approved by one of central servers 220, 222, 224, and 226.

A user on client 202 may then send a write request to receiving server 210, requesting to write a user identification number into a database stored on system 200. In response, receiving server 210 will recognize that a user identification number must satisfy the previously established global data rule. As a result, receiving server 210 generates an approval message with the user identification number from the write request, and transmits the approval message to a central server 220 for approval.

Upon receipt of the approval message, the central server 220 applies the global data rule. Central server 220 determines whether any information in its replica (which has global knowledge of information in system 200) is inconsistent with the user identification number it received in the approval request from receiving server 210. If central server 220 determines that there is information that is inconsistent with the user identification number it will transmit, to receiving server 210, a message denying approval of the write request. Consequently, receiving server 210 will not allow the write request from client 202. In some embodiments, receiving server 210 will also generate and transmit a message to client 202 indicating that the write request has been denied.

If the central server 220 determines that the user identification number does comply with the global data rule, in other words it is unique, central server 220 will write the user identification number in its own replica. Writing the user identification number to its own replica ensures that it has the most updated information. After central server 220 writes the user identification number to its own replica, it will replicate the change to the replicas on the other central servers 222, 224, and 226 to ensure that they maintain their global knowledge. Central server 220 will then generate and transmit a message to receiving server 210 approving the write request. Receiving server 210 will write the user identification number in its replica, and in some embodiments send a message to client 202 indicating that the write request was completed.

If shortly after the write request from client 202 is approved, another user on client 204 sends a write request with the same user identification number for a different person, the request will be appropriately denied. When receiving server 212 receives the write request from client 204, it will recognize that the user identification number is subject to a global data rule. As a result, it will generate an approval message and transmit the message to central server 222. Central server 222 will apply the global data rule by examining its replica to determine whether the security number from the write request has already been received in its replica for another person. Because central server 220 has already updated all replicas on the central servers 222, 224, and 226 with the data from client 202's write request, central server 222 will recognize that the user identification number from client 204's write request is not unique and will deny the write request. Thus, system 200 can efficiently and effectively enforce the global data rule requiring the uniqueness of user identification numbers.

It should be understood that some of the specific details of system 200 illustrated in FIG. 2 are presented only for purposes of simplicity and are not intended to be limiting. For example, FIG. 2 shows clients 202 and 204 as only accessing receiving servers 210 and 212 respectively, with the other receiving servers being unconnected to any clients. In other embodiments, clients 202 and 204 are able to access any of receiving servers 210, 212, 214, and 216. FIG. 2 also shows clients 202 and 204 using different networks 206 and 208 to access servers 210 and 212, however in other embodiments system 200 allows a number of clients, in addition to clients 202 and 204 to access servers 210, 212, 214, and 216 through the same network (or networks).

Networks 206 and 208 may be any type of computer network that is useful in connecting client computer systems with server computer systems. Networks 206 and 208 for example may be a local area network (LAN) or wide area network (WAN). In some embodiments, networks 206 and 208 include an intranet, the Internet and/or combinations thereof.

FIG. 2 also shows that central servers 220, 222, 224, and 226 are not accessed by clients. However, in some embodiments central servers 220, 222, 224, and 226 may be accessed by clients and accept write requests directly from clients, in addition to being tasked with enforcement of a global data rules. In these embodiments, there is no need to consult any other servers to enforce any applicable global data rules, because as described above central servers 220, 222, 224, and 226 have the global information for enforcing global data rules.

Furthermore, FIG. 2 shows that each of receiving servers 210, 212, 214, and 216 is connected to only one central server 220, 222, 224, and 226. In some embodiments, receiving servers 210, 212, 214, and 216 may be connected to central servers 220, 222, 224, and 226 in such a way that any receiving server can transmit approval requests to any central server. These embodiments provide additional fault tolerance to system 200. For example, if central server 220 is unavailable to process an approval request issued by receiving server 210, receiving server 210 can transmit the request to another central server for approval.

Figure 3:
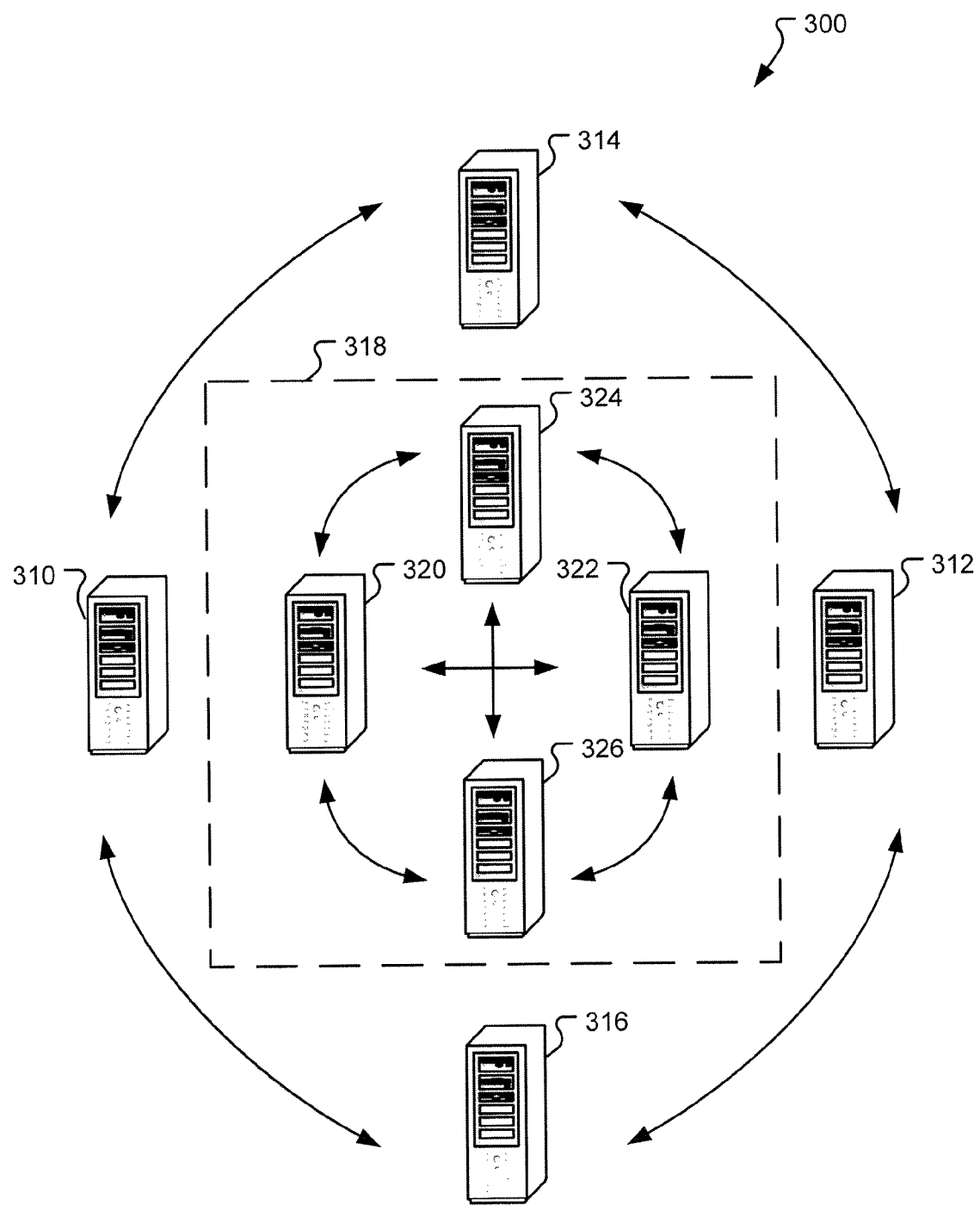
FIG. 3 illustrates the transfer of information during replication in the distributed system illustrated in FIG. 2.

FIG. 3 shows another embodiment of a distributed system 300. System 300 is similar to system 200 in that it includes two different types of servers, namely receiving servers 310, 312, 314, and 316 and a set of central servers 320, 322, 324, and 326, bounded by dashed line 318. Central servers 320, 322, 324, and 326 each have global knowledge of information (or can quickly build global knowledge) within system 300 that allows them to enforce global data rules. Shown in FIG. 3 are arrows that illustrate the direction of information transfer during replication between servers in system 300. That is, FIG. 3 generally shows the replication topology of the servers in system 300. In the embodiment shown in FIG. 3, receiving servers 310, 312, 314, and 316 have a different replication topology than central servers 320, 322, 324, and 326. As discussed below, the replication topology of central servers 320, 322, 324, and 326 is at least partially responsible for their global knowledge.

As shown in FIG. 3, receiving servers 310, 312, 314, and 316 have a ring replication topology. In a ring replication topology each server replicates with two other servers, with the first and last servers replicating with each other to form a loop or ring. In system 300, server 314 replicates with servers 310 and 312, while server 312 replicates with server 316 in addition to server 314. Server 316 replicates with server 310 in addition to server 312. Finally, server 310 replicates with servers 316 and 314, which completes the forming of a ring.

In an embodiment, central servers 320, 322, 324, and 326 have a fully connected replication topology. In a fully connected replication topology, each of the servers replicates with each other server. In system 300, server 320 replicates with servers 322, 324, and 326; server 322 replicates with servers 320, 324, and 326; server 324 replicates with servers 320, 322, and 326; and server 326 replicates with servers 320, 322, and 324. As can be seen in FIG. 3, the replication topology of central servers 320, 322, 324, and 326 allows all of the central servers to directly transmit information to all of the other central servers. This replication topology aids in the central servers maintaining global knowledge of changes made within system 300. In system 300 any change to information that is subject to a global data rule must be approved by one of central servers 320, 322, 324, and 326, which will immediately write the change to its own replica and based on its fully connected replication topology can directly replicate the change to all of the other central servers. This process ensures that the central servers all have the most up to date knowledge almost immediately after any changes are made in system 300.

As those with skill in the art will appreciate, configuring an efficient replication topology for a distributed system can be a complicated task, and depends on a variety of factors, such as the number of servers, how servers are connect, how the distributed system is organized (sites, domains, etc.), and the goals for the distributed system (data consistency, high availability of data, etc.). Thus, FIG. 3 is merely intended to show one embodiment of replication topologies for a system with a combination of receiving servers and central servers, where the central servers have global knowledge in order to enforce global data rules. Although system 300 shows that the receiving servers and the central servers have different replication topologies, in some embodiments, receiving servers and central servers may have the same replication topology.

In addition to the replication topology, in embodiments, central servers 320, 322, 324, and 326 also have a replication protocol that aids in maintaining their global knowledge. Because the central servers should have global knowledge when they receive an approval request, any changes made to one of the central servers 320, 322, 324, and 326 must very quickly be replicated to the other central servers. As a result, the central servers may implement a protocol that has a replication schedule with very short time periods between replication operations. In addition to, or instead of, a short period between replication operations, the central servers may implement a protocol that requires changes made to their replicas to be immediately (or very quickly) replicated directly to the other central servers.

It should be appreciated that in some embodiments, the protocol implemented by the central servers 320, 322, 324, and 326 may apply different replication schedules based on the importance or critical nature of a global data rule. For example, there may be some global data rules that are considered critical to an organization, in which case an administrator may want any changes to be immediately replicated to all of the central servers. Some global data rules however may not be as important in which case changes related to these rules may be replicated during a scheduled replication period. Of course, in embodiments the replication protocol implemented by central servers 320, 322, 324, and 326 may be different than the protocol implemented by receiving servers 310, 312, 314, and 316, which are not required to have global knowledge.

In other embodiments, central servers 320, 322, 324, and 326 may in addition to a specifically designed replication protocol and topology, also implement other methods that provides them with up-to-date knowledge for enforcing global data rules. For example in one embodiment, servers 320, 322, 324, and 326 may consult with each other before approving a request from the receiving servers 310, 312, 314, and 316. That is, when a central server receives a request that is subject to a global data rule, it will consult with all of the other central servers to ensure that the request does not conflict with data on the other central servers. In yet another embodiment, when a central server receives a request, it may send out a message to the other central servers indicating that it has received a request related to specific data. In response to receiving this message, the other central servers will not allow any requests that they receive that relate to that same data. The hold will be removed when the other central servers receive a second message from the original central server. The second message will contain the changed information.

Figure 4:
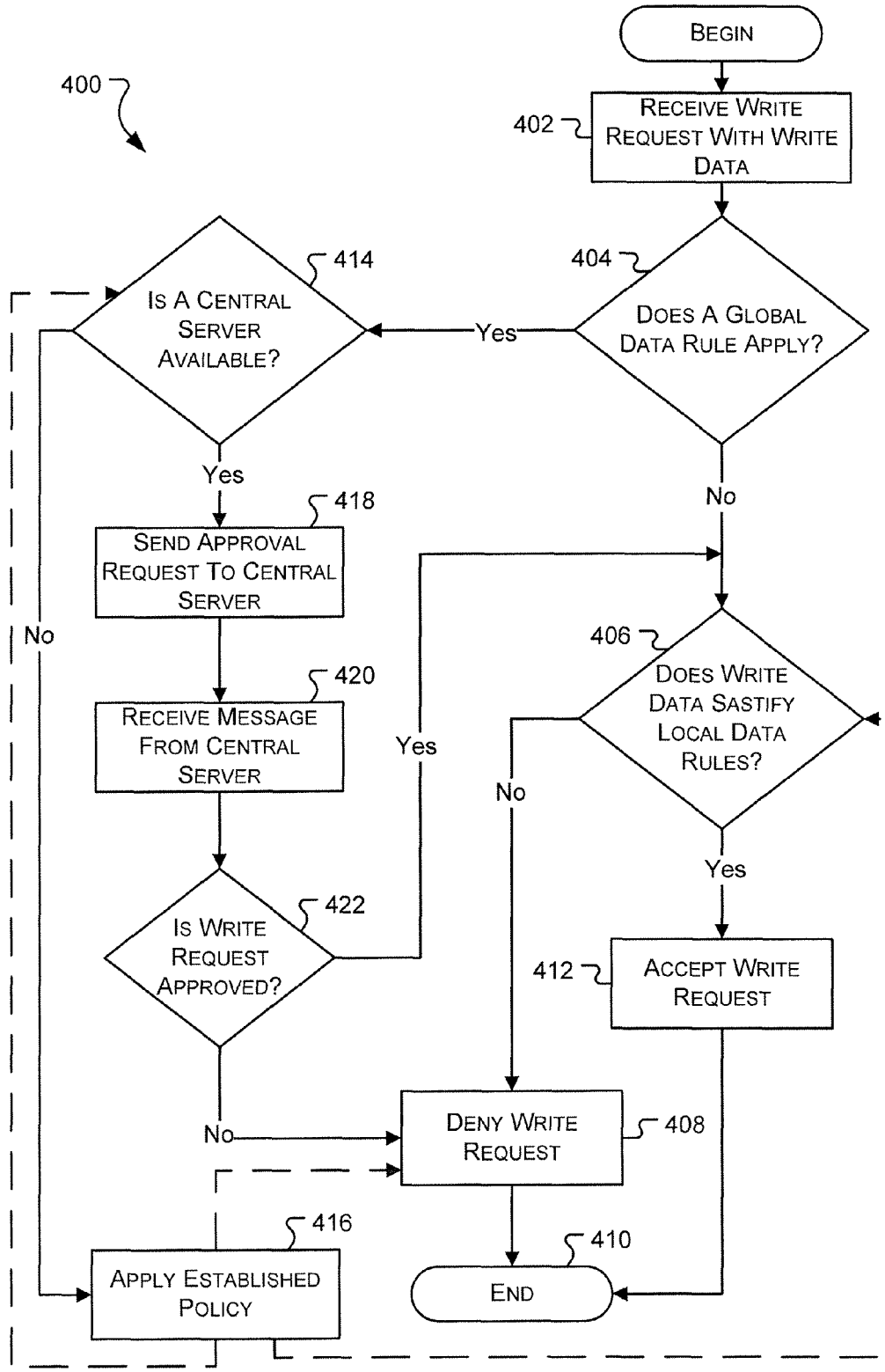
FIG. 4 illustrates an operational flow for processing of write requests in a distributed system.
Figure 5:
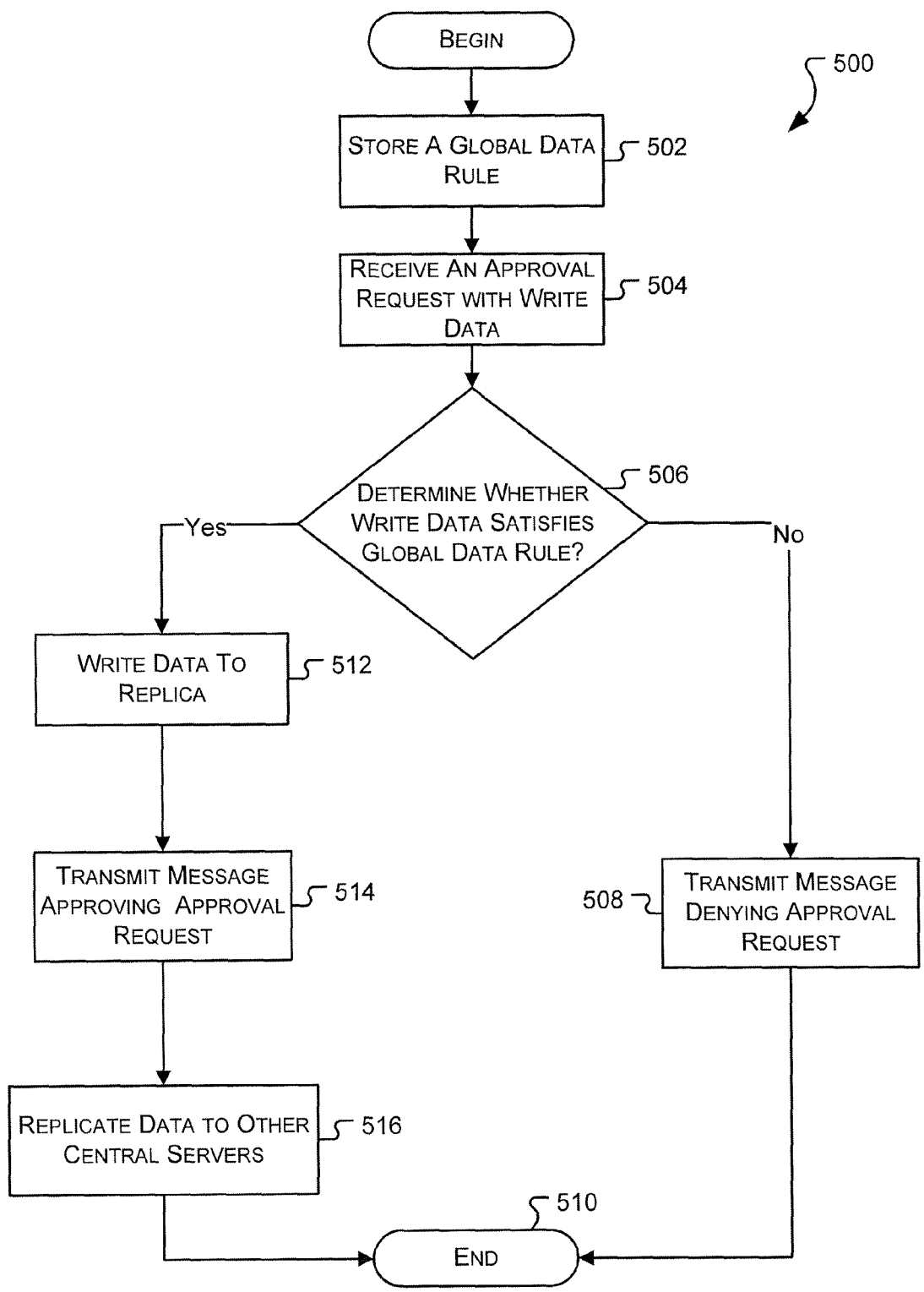
FIG. 5 illustrates an operational flow for applying a global data rule in a distributed system.

FIGS. 4 and 5 illustrate operational flows 400 and 500, according to embodiments. Operational flows 400 and 500 may be performed in any suitable computing environment. For example, the operational flows may be executed by systems such as illustrated in FIG. 2 and FIG. 3. Therefore, the description of operational flows 400 and 500, may refer to at least one of the components of FIG. 2 and FIG. 3. However, any such reference to components of FIG. 2 and FIG. 3 is for descriptive purposes only, and it is to be understood that the implementations of FIG. 2 and FIG. 3 are non-limiting environments for operational flows 400 and 500.

Furthermore, although operational flows 400 and 500 are illustrated and described sequentially in a particular order, in other embodiments, the operations may be performed in different orders, multiple times, and/or in parallel. Further, one or more operations may be omitted or combined in some embodiments.

FIG. 4 illustrates an operational flow 400 for processing a write request in a distributed system, according to an embodiment. At operation 402 a write request with write data is received. In embodiments, the write request is generated and transmitted by a client computing device such as clients 202, 204, 302, and 304 that is requesting to make changes to a replica on a receiving server. The write data received with the write request includes data that is to be written to a replica in the distributed system. In embodiments, the write request may be received by a receiving server such as the receiving servers described in FIG. 2 (servers 210, 212, 214, and 216) and FIG. 3 (servers 310, 312, 314, and 316).

After operation 402, flow then passes to operation 404 where a determination is made as to whether a global data rule applies to the write data received in the write request. An administrator of the distributed system may establish global data rules to constrain the data that is stored in the distributed system. As described above, one example of a data rule is requiring that data have a unique value throughout the distributed system. The enforcement of global data rules is in some embodiments delegated to a group of central servers such as the central servers described in FIG. 2 (servers 220, 222, 224, and 226) and FIG. 3 (servers 320, 312, 324, and 326).

If at operation 404 it is determined that the write data is not subject to a global data rule, flow passes to operation 406. At operation 406 a determination is made as to whether the write data satisfies any local data rules. As described above, a local data rule places limits on data written to the distributed system, but does not require global knowledge to enforce. In embodiments, a receiving server performs operation 406 and determines whether the write data satisfies any applicable local data rules.

If at operation 406 a determination is made that the write data does not satisfy the local data rules, flow passes to operation 408 where the write request is denied. Operation 408 in some embodiments involves generating and transmitting a message from the receiving server to the client, which originally generated the write request, indicating that the write request has been denied. After operation 408, flow ends at operation 410.

However, if at operation 406 a determination is made that the write data does satisfy applicable local data rules, flow passes to operation 412 where the write request is accepted and the write data written to the distributed system. Operation 412 in some embodiments involves generating and transmitting a message from the receiving server to the client that originally generated the write request indicating that the write request has been accepted. After operation 412, flow ends at operation 410.

It should be noted that in some embodiments, operational flow 400 may not include operation 406 if there are no local data rules to apply. In these embodiments, flow will pass directly from operation 404 to operation 412, where the write request is accepted and the write data written to the distributed system. Flow will then end at operation 410.

Referring back to operation 404, if a determination is made that a global data rule does apply, flow will pass from operation 404 to operation 414. At operation 414 a determination is made as to whether a central server is available for processing an approval request. In embodiments, after a receiving server determines at operation 404 that a global data rule applies it must send an approval request to a central server, which enforces global data rules. Operation 414 is performed to determine whether a central server is available to process an approval request generated by the receiving server. A central server may be unavailable for a number of reasons, such as a server crash, lost connection, and/or servers are busy processing other requests.

If at operation 414 a determination is made that a central server is not available, flow passes to operation 416. At operation 416 a policy regarding the unavailability of a central server is applied. The policy determines how write requests (subject to a global data rule) are processed when a central server is unavailable to approve the request. As shown in FIG. 4 (in the dashed lines), flow may pass from operation 416 to any of operations 406, 408, or 416, depending on the specific policy implemented at operation 416. In embodiments, the policy may be as simple as denying all of the write requests in which case flow passes to operation 408, or allowing all of the write requests in which case flow passes to operation 406. In another embodiment, the policy may require flow to loop from operation 416 back to operation 414, until a central server becomes available.

The policy will reflect the importance of individual data rules. For example, if a write request is subject to a data rule that is critically important to an organization, then the policy may reflect the importance of the data rule by denying any write requests subject to the critical data rule that cannot be approved by a central server. At the same time write requests subject to less important data rules may be allowed, even if they cannot be approved by a central server. In other embodiments, the policy may allow a write request that violates the global data rule, but log the fact that the violation has occurred. The log can then be used to later reconcile any inconsistencies with the global data rule. As those with skill in the art will appreciate, the specific policy established and applied at operation 416 will depend on the implementation of the distributed system.

Referring back to operation 414, if a determination is made that a central server is available, flow passes to operation 418 where an approval request is sent to a central server. The approval request seeks approval from a central server for accepting the write request and for writing the write data to the distributed system. In embodiments, operation 418 is performed by a receiving server, and involves a number of sub operations, such as generating the approval request with the write data received at operation 402, and then transmitting the approval request to a central server.

After operation 418, flow passes to operation 420 were a message is received from a central server. The message is in response to the approval request sent in operation 418. Following operation 420, flow passes to operation 422 where a determination is made whether the message received from the central server indicates that the central server has approved the write request. If at operation 422 a determination is made that the central server has not approved the write request, flow passes to operation 408 where the write request is denied as previously explained above.

If at operation 422 a determination is made that the central server has approved the write request, flow passes to operation 406 where a determination is made as to whether the write data satisfies any local data rules. From operation 406, flow will proceed as previously described above. In some embodiments, there will not be any local data rules, in which case flow will pass directly from operation 422 to operation 412 where the write request is accepted. Flow will then end at operation 410.

FIG. 4 should not be interpreted as limiting the order in which the operations of flow 400 are performed. For example, in one specific embodiment, operation 404 will be performed after, or concurrently with, operation 406. In other embodiments, operation 406 will be skipped altogether if no local data rules have been established.

FIG. 5 illustrates an operational flow 500 for enforcing a global data rule in a distributed system. Flow 500 beings with operation 502, where a global data rule is stored. In embodiments, operation 502 is performed by central servers with global knowledge of information in the distributed system, such as the central servers described in FIG. 2 (servers 220, 222, 224, and 226) and FIG. 3 (servers 320, 322, 324, and 326). The central servers are used to enforce global data rules, and ensure that any data written to the distributed system is consistent with established data rules.

After operation 502, flow passes to operation 504 where an approval request with write data is received. Operation 502 is performed by a central server that receives the approval request, which in embodiments is sent by a receiving server such as the receiving servers described in FIG. 2 (servers 210, 212, 214, and 216) and FIG. 3 (servers 310, 312, 314, and 316). The approval request seeks approval from the central server for a write request (i.e., a request to write data to the distributed system). In addition to other information, the write request includes the write data that is to be written to the distributed system.

At operation 506, a determination is made whether the write data received in the approval request, at operation 504, satisfies the stored global data rule from operation 502. If the write data does not satisfy the global data rule, flow passes to operation 508, where a message denying the approval request is transmitted. The central server, in embodiments, generates and transmits the message denying the approval request to the receiving server which sent the approval message. After operation 508, flow ends at operation 510.

If at operation 506 a determination is made that the write data satisfies the stored global data rule from operation 502, flow passes to operation 512, where the central server will write data received in the approval request to its own replica. As described above, central servers have (or can quickly build) global knowledge of the information within the distributed system in order to be able to enforce global data rules, and therefore when a change is approved in embodiments the first operation is to write the information into its own replica.

After operation 512, a message is transmitted approving the approval request at operation 514. Operation 514 involves, in embodiments, a central server generating and transmitting a message approving the approval request received in operation 504. The message indicates to a receiving server that it may accept a write request and write the data to a replica stored on the receiving server.

In some embodiments, the global data rule may involve an operation or business process associated with data being written to a distributed system. As one example, the global data rule may establish a rule that when a name is written (i.e., newly added or changed), the information must be forwarded to a human resource server. As those with skill in the art will appreciate, other business processes and operations may be established. In these embodiments, the business process or operation may be performed before, after, or concurrently with operations 512 and 514.

After operation 514, flow then passes to operation 516, where the data written in operation 512 by the central server is replicated to other central servers. The specific steps performed during operation 516 will be based on the replication protocol and topology established for central servers in the distributed system. As previously described with respect to FIG. 3, central servers may implement a variety of replication protocols and topologies, which are designed to ensure that the central servers maintain global knowledge of information in the distributed system.

FIG. 5 should not be interpreted as limiting the order in which the operations of flow 500 are performed. For example, in one specific embodiment, operation 516 will be performed immediately after, or concurrently with, operation 514. This embodiment ensures that the data written to the replica is quickly replicated to other central servers to ensure that they maintain global knowledge of information in the distributed system.

Figure 6:
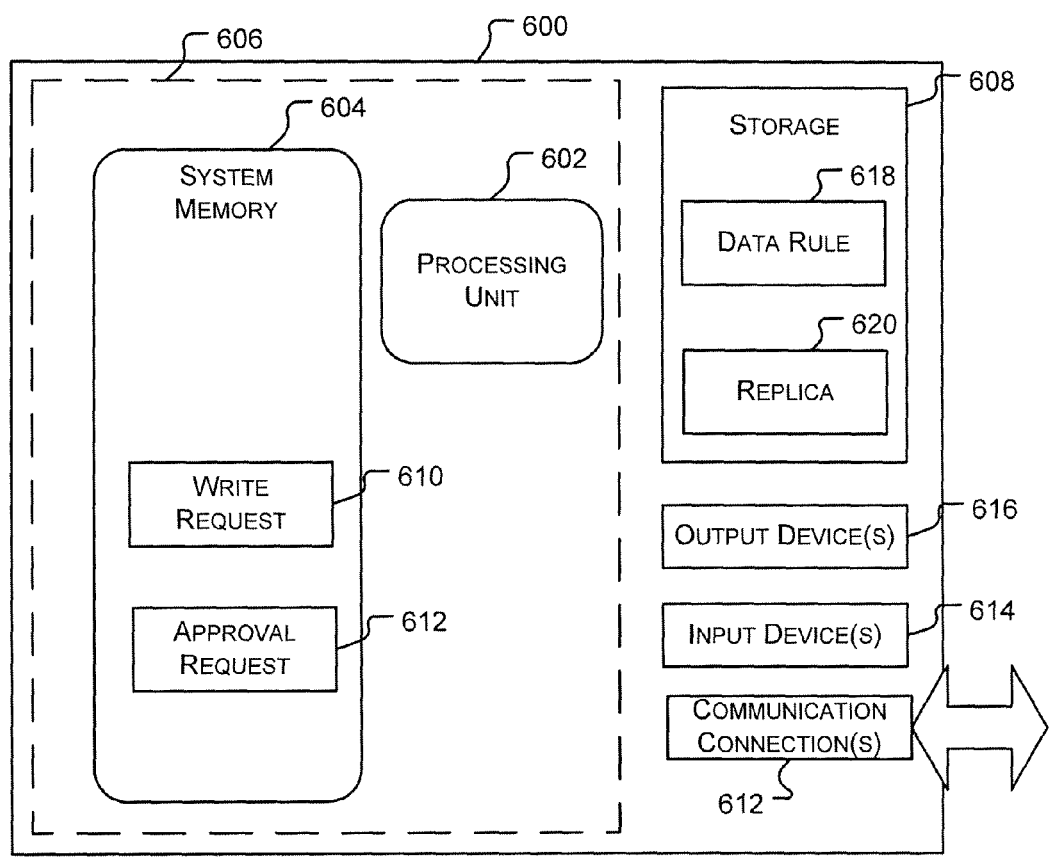
FIG. 6 illustrates a block diagram of a computing environment suitable for implementing embodiments.

FIG. 6 illustrates a general computer system 600, which can be used to implement the embodiments described herein. The computer system 600 is only one example of a computing environment and is not intended to suggest any limitation as to the scope of use or functionality of the computer and network architectures. Neither should the computer system 600 be interpreted as having any dependency or requirement relating to any one or combination of components illustrated in the example computer system 600. In embodiments, system 600 may be used as a receiving server and/or a central server described above with respect to FIGS. 2 and 3.

In its most basic configuration, system 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. System memory 604 stores applications that are executing on system 600. In addition to applications, memory 604 may also store information being used in operations being performed by system 600, such as a write request 610 and/or an approval request 612, as described above with respect to FIGS. 2-5.

Additionally, system 600 may also have additional features/functionality. For example, device 600 may also include additional storage 608 (removable and/or non-removable) including, but not limited to, magnetic or optical disks or tape. Such additional storage is illustrated in FIG. 6 by storage 608. Computer storage media includes volatile and nonvolatile, removable and non-removable media implemented in any method or technology for storage of information such as computer readable instructions, data structures, program modules or other data. Memory 604 and storage 608 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 600. Any such computer storage media may be part of system 600.

As those with skill in the art will appreciate, storage 608 may store a variety of information. Among other types of information, storage 608 may store a data rule 618 and a replica 620 of information on a distributed system. The data rule may be a local data rule or a global data rule depending upon whether the system 600 is a receiving server or a central server as described above with respect to FIGS. 2 and 3.

System 600 may also contain communications connection(s) 612 that allow the system to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 600 may also have input device(s) 614 such as keyboard, mouse, pen, voice input device, touch input device, etc. Output device(s) 616 such as a display, speakers, printer, etc. may also be included. All these devices are well know in the art and need not be discussed at length here.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

We claim:

1. A computer implemented method of processing write requests in a distributed system comprising a plurality of servers each storing a replica of the same data and engaging in replication to maintain data consistency among each of the replicas stored on the plurality of servers, the method comprising:

storing a policy at a first server for deciding whether to accept or deny a write request if a central server is unavailable, wherein the first server is one of a first plurality of servers and the central server is one of a second plurality of servers;

receiving at the first server a write request with data to be written to a replica stored on the first server;

determining by the first server whether the data to be written to the replica stored on the first server is subject to a global data rule;

in response to the determining by the first server that the data to be written to the replica is subject to the global data rule, the first server transmitting an approval request to the central server to approve the acceptance of the write request, wherein the central server has global knowledge;

receiving a message from the central server indicating whether the approval request has been approved;

in response to the central server approving the approval request, the first server accepting the write request and writing the data to the replica stored on the first server;

in response to the central server not approving the approval request, the first server denying the write request;

wherein the plurality of receiving servers replicate changes made to at least one of the plurality of receiving servers each time a first period of time elapses; and wherein the plurality of central servers replicate changes made to at least one of the plurality of central servers each time a change is made to at least one of the plurality of central servers.

2. The computer implemented method of claim 1, further comprising:

determining by the first server whether the data to be written to the replica stored on the first server satisfies a local data rule; and in response to a determination that the data does satisfy the local data rule and the central server approving the approval request, the first server accepting the write request and writing the data to the replica stored on the first server; and in response to a determination that the data does not comply with the local data rule, the first server denying the write request.

3. The computer implemented method of claim 1, wherein the transmitting includes generating the approval message and including the data in the approval request.

4. The computer implemented method of claim 3, wherein the central server stores the global data rule and determines whether the data in the approval request satisfies the global data rule.

5. The computer implemented method of claim 3, wherein the data rule requires the data to be unique with respect to other data stored in the distributed system.

6. The computer implemented method of claim 1, wherein the distributed system stores a distributed directory and the write request is generated using the Lightweight Directory Access Protocol.

7. The computer implemented method of claim 1, wherein the distributed system stores a distributed file system and the write request relates to writing data to a file on the distributed file system.

8. The computer implemented method of claim 1, wherein the write request is received from a client accessing the distributed system.

9. A computer implemented method of enforcing a global data rule in a distributed system comprising a plurality of servers each storing a replica of the same data and engaging in replication to maintain data consistency among the replicas stored on the plurality of servers, the method comprising the steps of:

storing at a central server a global data rule for enforcement by the central server, wherein the central server is one of a first plurality of servers;

receiving at the central server an approval request transmitted by a receiving server that is one of a second plurality of servers, wherein the approval request relates to a write request received at the receiving server and the approval request includes data to be written to a replica stored on the receiving server, the data being subject to the global data rule, wherein the receiving server stores a policy for deciding whether to accept or deny a write request if none of the first plurality of servers is available;

determining by the central server, whether the data to be written to the receiving server satisfies the global data rule;

in response to a determination that the data does not satisfy the global data rule, transmitting a message to the receiving server denying the approval request; and in response to a determination that the data satisfies the global data rule:
  writing the data to a replica stored on the central server; and
  transmitting a message to the receiving server approving the write request;

wherein the second plurality of servers replicate changes made to at least one of the first plurality of servers each time a first period of time elapses; and wherein the first plurality of servers replicate changes made to at least one of the second plurality of servers each time a second period of time elapses, the second period of time being shorter than the first period of time.

10. The computer implemented method of claim 9, further comprising:
  after the writing, replicating the data to a second central server that is one of the plurality of servers.

11. The computer implemented method of claim 10, wherein the replicating is performed before the transmitting.

12. The computer implemented method of claim 9, wherein the distributed system stores a distributed directory service and the write request is generated using the Lightweight Directory Access Protocol.

13. A distributed system, comprising:
  a plurality of central servers, each of the plurality of central servers storing a data rule that requires global knowledge to enforce and each being operable to:
    receive an approval request seeking approval to write data to a receiving server, wherein the approval request includes the data, wherein the data is subject to the data rule;
    determine whether the write data complies with the data rule;
    in response to a determination that the data does not comply with the data rule, transmit a message to the receiving server denying the approval request; and
    in response to a determination that the data complies with the data rule:
      write the data to the central server, and
      transmit a message to the receiving server approving the approval request; and
      a plurality of receiving servers, each of the receiving servers operable to:
        receive a write request to write data to the receiving server;
        store a policy for deciding whether to accept or deny a write request if none of the plurality of central server is available;
        send an approval request to one of the plurality of central servers, wherein the approval request seeks approval from the one of the plurality of central server for the write request;
    in response to receiving a message from the central server approving the approval request, accept the write request and write the data to the receiving server; and
    in response to receiving a message from the central server denying the approval request, deny the write request; and
  wherein the plurality of receiving servers replicate changes made to at least one of the plurality of receiving servers each time a first period of time elapses; and
  wherein the plurality of central servers replicate changes made to at least one of the plurality of central servers each time a change is made to at least one of the plurality of central servers.

14. The distributed system of claim 13, wherein the plurality of central servers implement a different replication protocol than the plurality of receiving servers.

15. The distributed system of claim 13, wherein the plurality of central servers implement a different replication topology than the plurality of receiving servers.

16. The distributed system of claim 15, wherein the plurality of central servers implement a fully connected replication topology.

17. The distributed system of claim 13, wherein the plurality of central servers are each further operable to receive a write request to write data to the central server.

* * * * *